US012469392B2

(12) United States Patent
Tsujino et al.

(10) Patent No.: US 12,469,392 B2
(45) Date of Patent: Nov. 11, 2025

(54) VEHICLE DISPLAY CONTROL DEVICE, VEHICLE DISPLAY CONTROL METHOD, AND STORAGE MEDIUM

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Makoto Suzuki, Seto (JP); Takatoshi Hattori, Nagoya (JP); Keigo Hori, Toyota (JP); Kazuhisa Murakami, Toyota (JP); Shinji Ohba, Toyota (JP); Tomoki Yoshimoto, Okazaki (JP); Rikuto Kubota, Toyota (JP); Daisuke Fukutomi, Toyota (JP); Kentaro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/507,154

(22) Filed: Nov. 13, 2023

(65) Prior Publication Data

US 2024/0212503 A1    Jun. 27, 2024

(30) Foreign Application Priority Data

Dec. 26, 2022    (JP) .................................. 2022-209063

(51) Int. Cl.
*G08G 1/16*    (2006.01)

(52) U.S. Cl.
CPC .................................. *G08G 1/167* (2013.01)

(58) Field of Classification Search
None
See application file for complete search history.

(56) References Cited

U.S. PATENT DOCUMENTS

| 8,514,100 B2* | 8/2013 | Yamashita ............. G08G 1/166 |
| | | 701/301 |
| 10,325,641 B2* | 6/2019 | Wootton ............. G11C 11/2297 |
| 2004/0143381 A1* | 7/2004 | Regensburger .... G01C 21/3602 |
| | | 701/1 |
| 2007/0233343 A1* | 10/2007 | Saito ........................ B62D 1/28 |
| | | 701/41 |
| 2008/0258884 A1* | 10/2008 | Schmitz ................ G01S 13/931 |
| | | 340/425.5 |
| 2010/0001883 A1* | 1/2010 | Koenig ................ B62D 15/029 |
| | | 340/988 |
| 2010/0253598 A1* | 10/2010 | Szczerba ............. G06V 10/806 |
| | | 701/532 |
| 2014/0067250 A1* | 3/2014 | Bone ...................... G08G 1/167 |
| | | 701/301 |
| 2014/0218526 A1* | 8/2014 | Feid ........................ B60Q 9/00 |
| | | 348/148 |

(Continued)

FOREIGN PATENT DOCUMENTS

JP    2021-109582 A    8/2021

*Primary Examiner* — Muhammad Adnan
(74) *Attorney, Agent, or Firm* — Oliff PLC

(57) ABSTRACT

A vehicle display control device includes a processor. The processor detects a lane marking in an object lane in which a vehicle is traveling. When the vehicle is approaching the lane marking, the processor displays a lane marking image representing the lane marking in different display styles depending on whether a predetermined condition for calling attention is satisfied or not.

9 Claims, 5 Drawing Sheets

(56) References Cited

U.S. PATENT DOCUMENTS

| | | | | |
|---|---|---|---|---|
| 2022/0169274 A1* | 6/2022 | Seitz | .................. | B60W 60/001 |
| 2022/0171590 A1* | 6/2022 | Seitz | ..................... | B60W 50/14 |
| 2023/0358558 A1* | 11/2023 | Beaurepaire | ......... | G06V 20/588 |
| 2024/0383474 A1* | 11/2024 | Yoon | .................. | B60W 40/072 |

* cited by examiner

VEHICLE DISPLAY CONTROL DEVICE, VEHICLE DISPLAY CONTROL METHOD, AND STORAGE MEDIUM

CROSS-REFERENCE TO RELATED APPLICATION

This application claims priority to Japanese Patent Application No. 2022-209063 filed on Dec. 26, 2022, incorporated herein by reference in its entirety.

BACKGROUND

1. Technical Field

The present disclosure relates to a vehicle display control device, a vehicle display control method, and a storage medium.

2. Description of Related Art

Japanese Unexamined Patent Application Publication No. 2021-109582 (JP 2021-109582 A) discloses a lane change assistance device. This lane change assistance device includes an operation unit, a display unit, and a control unit that is configured to be capable of executing lane change assistance control in which a steering angle of a vehicle is controlled so as to assist in the vehicle changing lanes, and that performs control of images to be displayed on the display unit. The control unit displays a first image on the display unit when an operation continuation time is no shorter than a first continuation threshold time. Also, the control unit switches the first image to a second image when the operation continuation time is no shorter than a second continuation threshold time, which is longer than the first continuation threshold time.

With the lane change assistance device disclosed in JP 2021-109582 A, when a vehicle is approaching a lane marking, whether a predetermined condition for calling attention is satisfied cannot be comprehended. Therefore, when calling attention is not performed, the driver cannot comprehend whether the reason thereof is that the predetermined condition is not satisfied, or that the vehicle is not approaching the lane marking.

SUMMARY

The present disclosure provides a vehicle display control device, a vehicle display control method, and a storage medium, whereby the driver can comprehend the reason why calling attention is not performed, by being able to comprehend whether the predetermined condition is satisfied.

A vehicle display control device according to a first aspect of the present disclosure includes a processor. The processor is configured to detect a lane marking in an object lane in which a vehicle is traveling. The processor is configured to, when the vehicle is approaching the lane marking, display a lane marking image representing the lane marking in different display styles depending on whether a predetermined condition for calling attention is satisfied or not.

In the vehicle display control device according to this aspect, the processor detects the lane marking in the object lane in which the vehicle is traveling. When the vehicle is approaching the lane marking, the processor displays a lane marking image representing the lane marking with a different display style depending on whether the predetermined condition for calling attention is satisfied or the predetermined condition is not satisfied. Being able to comprehend whether the predetermined condition is satisfied enables comprehension of the reason why calling attention is not performed.

The processor may be configured to display the lane marking image in a more enhanced manner when the predetermined condition is satisfied, as compared to when the predetermined condition is not satisfied.

In the vehicle display control device according to this aspect, the driver can be made to take caution so that the vehicle does not approach the lane marking.

The processor may be configured to acquire a speed of the vehicle. The processor may be configured to display the lane marking image in the different display styles depending on whether the speed of the vehicle is lower than a predetermined speed or not.

In the vehicle display control device according to this aspect, when the speed of the vehicle is no lower than the predetermined speed and the vehicle is approaching the lane marking, calling attention is performed, so that safety of pedestrians can be protected.

The processor may be configured to display a warning image for calling of the attention when the predetermined condition is satisfied, and also the vehicle is approaching the lane marking.

In the vehicle display control device according to this aspect, the driver can intuitively recognize that the vehicle is approaching the lane marking and that caution is required.

The processor may be configured to acquire a distance between the vehicle and the lane marking. The processor may be configured to display the warning image in different display styles in accordance with the distance between the vehicle and the lane marking.

In the vehicle display control device according to this aspect, the level of the distance between the vehicle and the lane marking can be recognized.

A vehicle display control method according to another aspect of the present disclosure includes detecting, by a processor, a lane marking in an object lane in which a vehicle is traveling, and when the vehicle is approaching the lane marking, displaying, by the processor, a lane marking image representing the lane marking in different display styles depending on whether a predetermined condition for calling attention is satisfied or not.

In the vehicle display control method according to this aspect, the reason why calling attention is not performed can be comprehended, by being able to comprehend whether the predetermined condition is satisfied.

A non-transitory storage medium according to yet another aspect of the present disclosure stores instructions that are executable by one or more processors and that cause the one or more processors to perform functions. The functions include detecting a lane marking in an object lane in which a vehicle is traveling, and when the vehicle is approaching the lane marking, displaying a lane marking image representing the lane marking in different display styles depending on whether a predetermined condition for calling attention is satisfied or not.

In the storage medium according to this aspect, the reason why calling attention is not performed can be comprehended, by being able to comprehend whether the predetermined condition is satisfied.

According to the present disclosure, being able to comprehend whether the predetermined condition is satisfied enables comprehension of the reason why calling attention is not performed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle 12 according to an embodiment will be described below with reference to the drawings.

Figure 1:
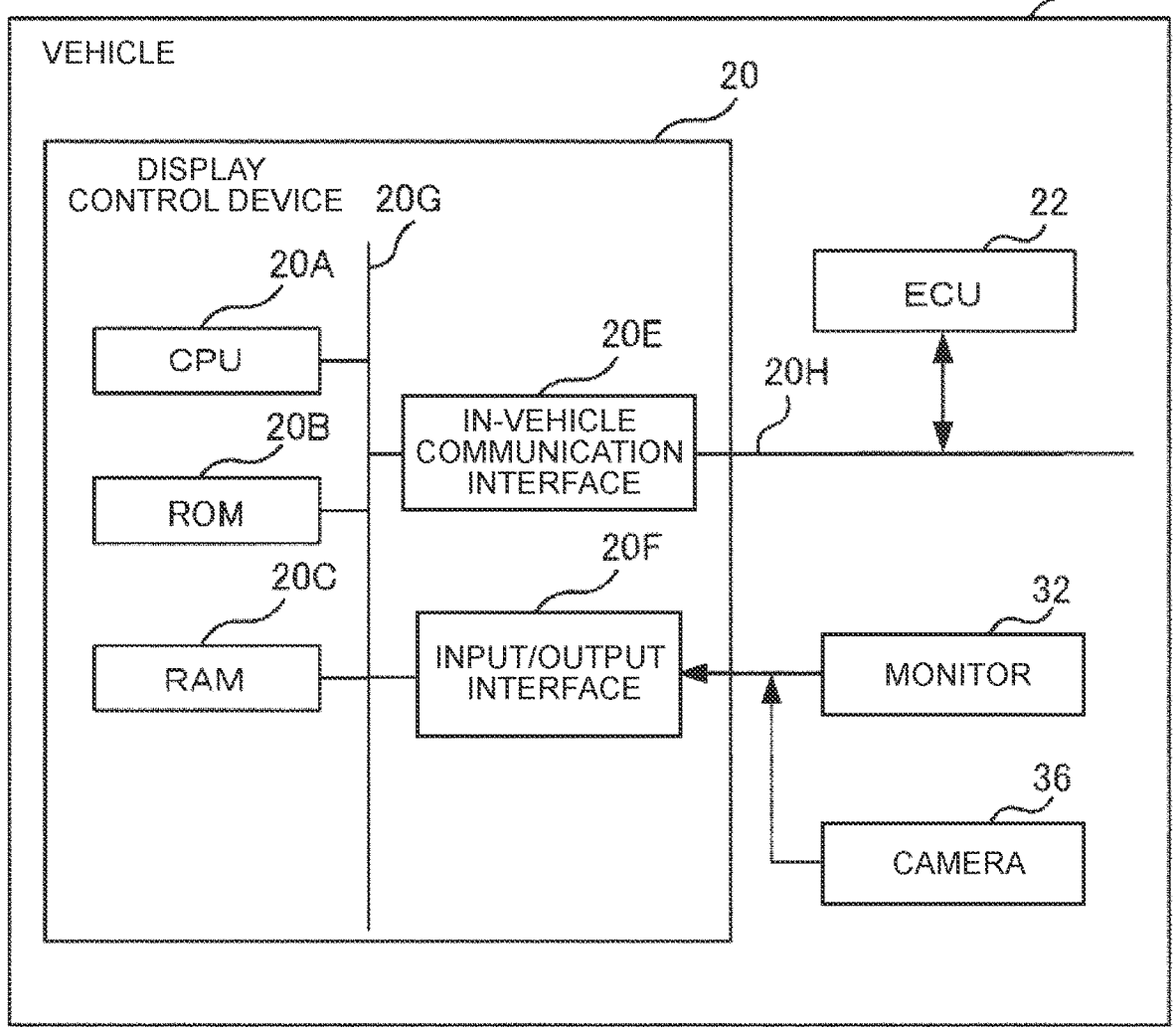
FIG. 1 is a block diagram illustrating an example of a hardware configuration of a vehicle according to an embodiment.

As illustrated in FIG. 1, the vehicle 12 includes a display control device 20 serving as a vehicle display control device, an electronic control unit (ECU) 22, a monitor 32, and a camera 36.

Examples of the ECU 22 include an engine ECU that controls output of an engine, a body ECU that controls each part of a body, and an advanced driver-assistance system (ADAS)-ECU that centrally controls an ADAS or the like.

As an example, the engine ECU acquires speed of the vehicle 12, engine revolutions, and so forth, in order to control the engine.

The display control device 20 includes a central processing unit (CPU) 20A, read-only memory (ROM) 20B, random access memory (RAM) 20C, an in-vehicle communication interface 20E, and an input/output interface 20F. The CPU 20A, the ROM 20B, the RAM 20C, the in-vehicle communication interface 20E, and the input/output interface 20F are communicably connected to each other via an internal bus 20G. The CPU 20A is an example of a processor.

The CPU 20A is a central processing unit that executes various types of programs and controls each unit. That is to say, the CPU 20A reads a program from the ROM 20B, and executes the program using the RAM 20C as a work area.

Figure 2:
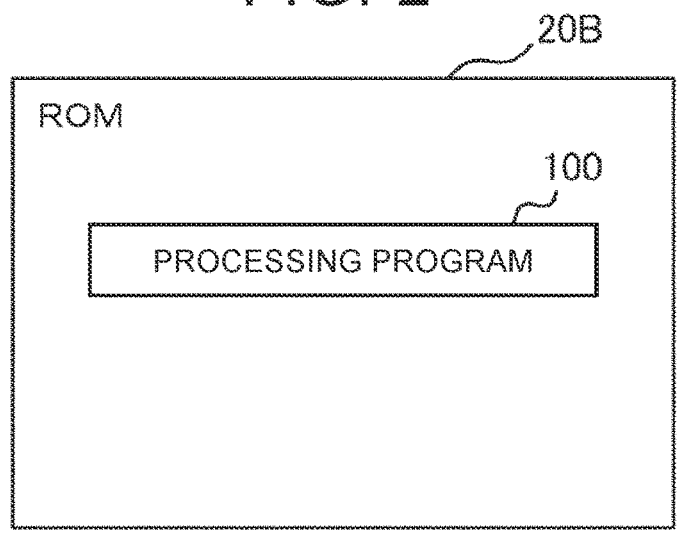
FIG. 2 is a block diagram illustrating an example of a configuration of read-only memory (ROM) in a display control device according to the embodiment.

The ROM 20B stores various types of programs and various types of data. As illustrated in FIG. 2, the ROM 20B according to the present embodiment stores a processing program 100. Note that the processing program 100 may be stored in storage such as a hard disk drive (HDD), a solid state drive (SSD), or the like.

The processing program 100 serving as a vehicle display control program is a program for performing vehicle display control processing, which will be described later.

Returning to FIG. 1, the RAM 20C serves as a work area and temporarily stores programs or data.

The in-vehicle communication interface 20E is an interface for connecting with the ECU 22. This interface uses a communication standard in accordance with the Controller Area Network (CAN) protocol. The in-vehicle communication interface 20E is connected to the ECU 22 via an external bus 20H.

The input/output interface 20F is an interface for communicating with the monitor 32 and the camera 36. Note that the camera 36 may be connected to the display control device 20 via an ECU 22 such as the ADAS-ECU or the like.

The monitor 32 is a liquid crystal monitor provided on a meter panel, an instrument panel, or the like.

The camera 36 is a shooting device having an optical axis facing a direction of travel of the vehicle 12. The camera 36 may be installed inside the vehicle 12, or outside the vehicle 12.

Figure 3:
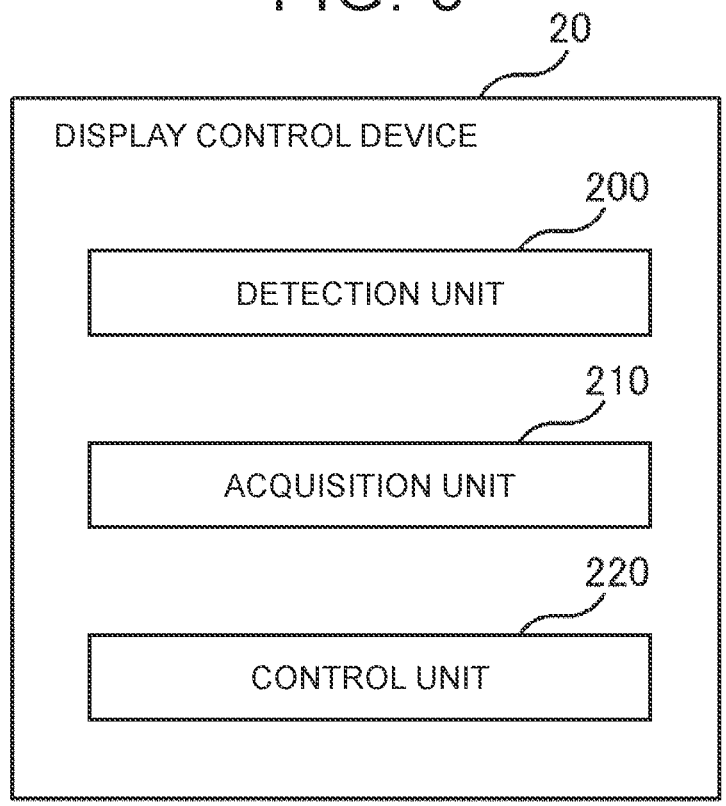
FIG. 3 is a block diagram illustrating an example of a functional configuration of a central processing unit (CPU) in the display control device according to the embodiment.

As illustrated in FIG. 3, in the display control device 20 according to the present embodiment, the CPU 20A functions as a detection unit 200, an acquisition unit 210, and a control unit 220 by executing the processing program 100.

The detection unit 200 has a function of detecting lane markings W in an object lane in which the vehicle 12 is traveling. In the present embodiment, the detection unit 200 detects the lane markings W using difference in luminance in the image data of the scenery ahead of the vehicle 12 that is shot by the camera 36 (hereinafter referred to simply as "image data"). Roads are generally paved with asphalt, and accordingly roads appear in image data in a color with relatively low luminance (e.g., black). On the other hand, the lane markings W are drawn on the road with a higher luminance than the road, and accordingly the lane markings W appear in the image data as a color with a relatively high luminance (e.g., white or yellow).

Specifically, the detection unit 200 scans an entirety of one frame of image data in a lateral direction at predetermined intervals, and determines whether contrast, which is change in luminance, is greater than a predetermined threshold value, for each pixel. The detection unit 200 then extracts, from the one frame of image data, a pixel portion having contrast greater than the predetermined threshold value, as an edge point. The detection unit 200 then connects all the extracted edge points to each other by lines, thereby detecting the lane markings W.

Note that the method by which the detection unit 200 detects the lane markings W is not limited to the method described above. For example, the detection unit 200 may detect the lane markings W by extracting pixel portions of which the luminance is no lower than a predetermined threshold in the image data, and connecting the pixel portions to each other by lines.

Further, the detection unit 200 detects whether driving of the vehicle 12 has ended. Specifically, the detection unit 200 detects whether the driving of the vehicle 12 has ended via a sensor that detects a rotation state of an ignition key.

The acquisition unit 210 has a function of acquiring the speed of the vehicle 12. Specifically, the acquisition unit 210 acquires the speed of the vehicle 12 from the engine ECU.

Figure 4:
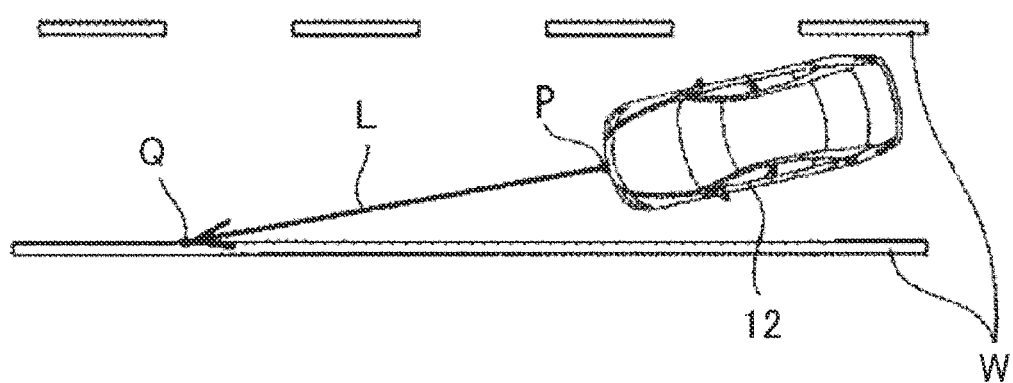
FIG. 4 is a schematic diagram for describing an example of distance between the vehicle and a lane marking according to the embodiment.

The acquisition unit 210 also has a function of acquiring a distance between the vehicle 12 and the lane marking W. As illustrated in FIG. 4, according to the present embodiment, the acquisition unit 210 performs image processing regarding the image data to acquire a distance between a central point P at a front end portion of the vehicle 12, and an intersecting point Q at which a parallel line L that extends from the central point P in a direction parallel to the direction of travel of the vehicle 12 intersects the lane marking W. However, this example is not limiting. For example, an arrangement may be made in which the acquisition unit 210 acquires, of a distance between the central point P and a point closest to the central point P on a lane marking WL on a left side in the direction of travel of the vehicle 12, and a distance between the central point P and a point closest to the central point P on a lane marking WR on a right side in the direction of travel of the vehicle 12, the shorter as the distance between the vehicle 12 and the lane marking W.

The control unit 220 has a function of changing a display style depending on whether a predetermined condition for calling attention when the vehicle 12 is approaching the lane marking W is satisfied, or the predetermined condition is not satisfied, and displays a lane marking image D representing the lane marking W accordingly.

According to the present embodiment, a condition that the speed of the vehicle 12 is no lower than a predetermined speed is applied as the predetermined condition. In other words, the control unit 220 has a function of displaying the lane marking image D in different display styles depending on whether the speed of the vehicle 12 is no lower than the predetermined speed or the speed of the vehicle 12 is lower than the predetermined speed. According to the present embodiment, a speed set by the driver of the vehicle 12, the manufacturer of the vehicle 12, or the like, in advance (e.g., 40 km/h) is applied as the predetermined speed. However, this example is not limiting. For example, the control unit 220 may display the lane marking image D in different display styles depending on whether a pedestrian walking on the sidewalk adjacent to the object lane is detected from the image data, or no pedestrian is detected.

Further, according to the present embodiment, the control unit 220 has a function of displaying the lane marking image D in a more enhanced manner when the predetermined condition is satisfied, as compared to when the predetermined condition is not satisfied. Specifically, the control unit 220 displays the lane marking image D in continuous lines on the monitor 32 when the predetermined condition is satisfied, and displays the lane marking image D in dotted lines on the monitor 32 when the predetermined condition is not satisfied.

However, this example is not limiting. For example, the control unit 220 may display the lane marking image D on the monitor 32 in a color more removed from the background color when the predetermined condition is satisfied, as compared to when the predetermined condition is not satisfied. For example, when white is used as the background color indicating the color of the road, the control unit 220 displays the lane marking image D in black when the predetermined condition is satisfied, and displays the lane marking image D in gray when the predetermined condition is not satisfied. Alternatively, when the lane marking image D is displayed in white, the control unit 220 may apply black as the background color indicating the color of the road when the predetermined condition is satisfied, and apply gray as the background color when the predetermined condition is not satisfied.

Also, the control unit 220 may display the lane marking image D on the monitor 32 in a darker color, or larger, when the predetermined condition is satisfied, as compared to when the predetermined condition is not satisfied. Alternatively, the control unit 220 may display the lane marking image D on the monitor 32 in a more enhanced manner, when the predetermined condition is not satisfied, as compared to when the predetermined condition is satisfied.

Also, the control unit 220 displays a warning image H that calls attention when the predetermined condition is satisfied and also the vehicle 12 is approaching the lane marking W. Specifically, the control unit 220 displays the warning image H on the monitor 32 when the predetermined condition is satisfied, and the distance between the vehicle 12 and the lane marking W is no more than a proximity distance. According to the present embodiment, a distance set in advance by the driver of the vehicle 12, the manufacturer of the vehicle 12, or the like, is applied as the proximity distance. However, this example is not limiting. A distance that is set for each type of vehicle 12, and that is set to be smaller the wider the vehicle 12 is, may be applied as the proximity distance, for example.

Note that the control unit 220 may call attention when the predetermined condition is satisfied and also the vehicle 12 is approaching the lane marking W, by a method other than displaying the warning image H. For example, when the predetermined condition is satisfied and the vehicle 12 is approaching the lane marking W, the control unit 220 may call attention by sound via a speaker.

According to the present embodiment, the control unit 220 has a function of changing the display style of the warning image H in accordance with the distance between the vehicle 12 and the lane marking W. According to the present embodiment, the closer the distance between the vehicle 12 and the lane marking W is, the more the control unit 220 enhances the warning image H displayed. Specifically, when the distance between the vehicle 12 and the lane marking W is no more than a warning distance, the control unit 220 displays the warning image H larger as compared to when the distance between the vehicle 12 and the lane marking W is greater than the warning distance. The warning distance is a distance smaller than the proximity distance. According to the present embodiment, a distance set in advance by the driver of the vehicle 12, the manufacturer of the vehicle 12, or the like, is applied as the warning distance. However, this example is not limiting. A distance that is set for each type of vehicle 12, which is a distance that is set to be smaller the wider the vehicle 12 is, or the like, may be applied as the warning distance.

Note that for example, the control unit 220 may perform display of the warning image H such that the shorter the distance between the vehicle 12 and the lane marking W is, the darker the color of the warning image H is, or the more removed the color is from the background color. Alternatively, the longer the distance between the vehicle 12 and the lane marking W is, the more enhanced the display of the warning image H may be.

Flow of Control

The flow of the vehicle display control processing executed by the display control device 20 according to the present embodiment will be described with reference to FIG. 5. The vehicle display control processing is realized by the CPU 20A functioning as the detection unit 200, the acquisition unit 210, and the control unit 220. Note that the vehicle display control processing corresponds to processing executed by the CPU 20A serving as a computer, in accordance with the vehicle display control method according to the present embodiment.

Figure 5:
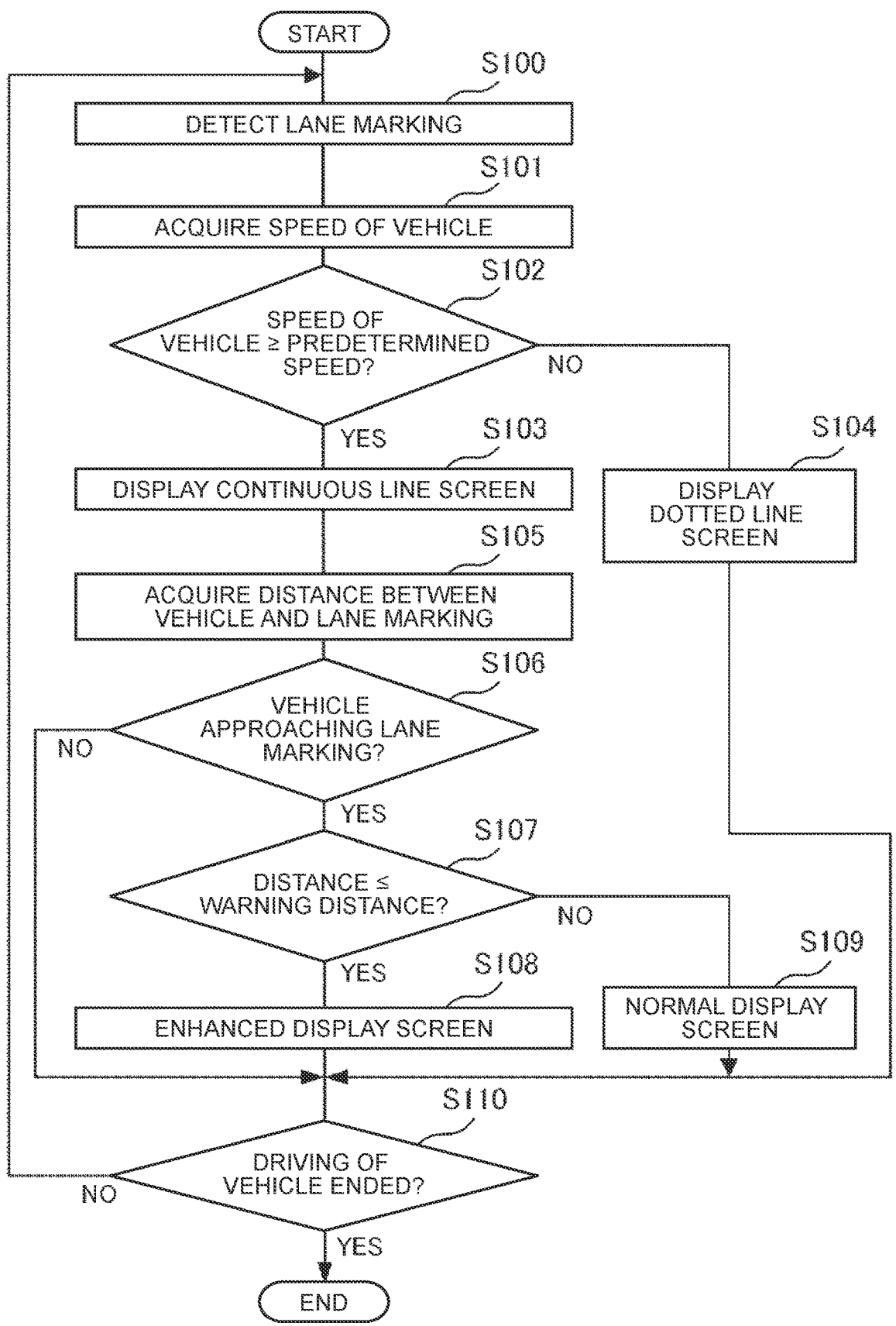
FIG. 5 is a flowchart showing an example of a flow of vehicle display control processing according to the embodiment.

In step S100 in FIG. 5, the CPU 20A detects the lane marking W in the object lane in which the vehicle 12 is traveling. Specifically, the CPU 20A detects the lane marking W using the difference in luminance in the image data.

In step S101, the CPU 20A acquires the speed of the vehicle 12. Specifically, the CPU 20A acquires the speed of the vehicle 12 from the engine ECU.

In step S102, the CPU 20A determines whether the speed of the vehicle 12 is no lower than the predetermined speed. When the speed of the vehicle 12 is no lower than the predetermined speed (YES in step S102), the CPU 20A transitions to step S103. On the other hand, when the speed of the vehicle 12 is lower than the predetermined speed (NO in step S102), the CPU 20A transitions to step S104.

In step S103, the CPU 20A displays on the monitor 32 a continuous line screen conforming to a predetermined format. The flow then transitions to step S105.

Figure 6:
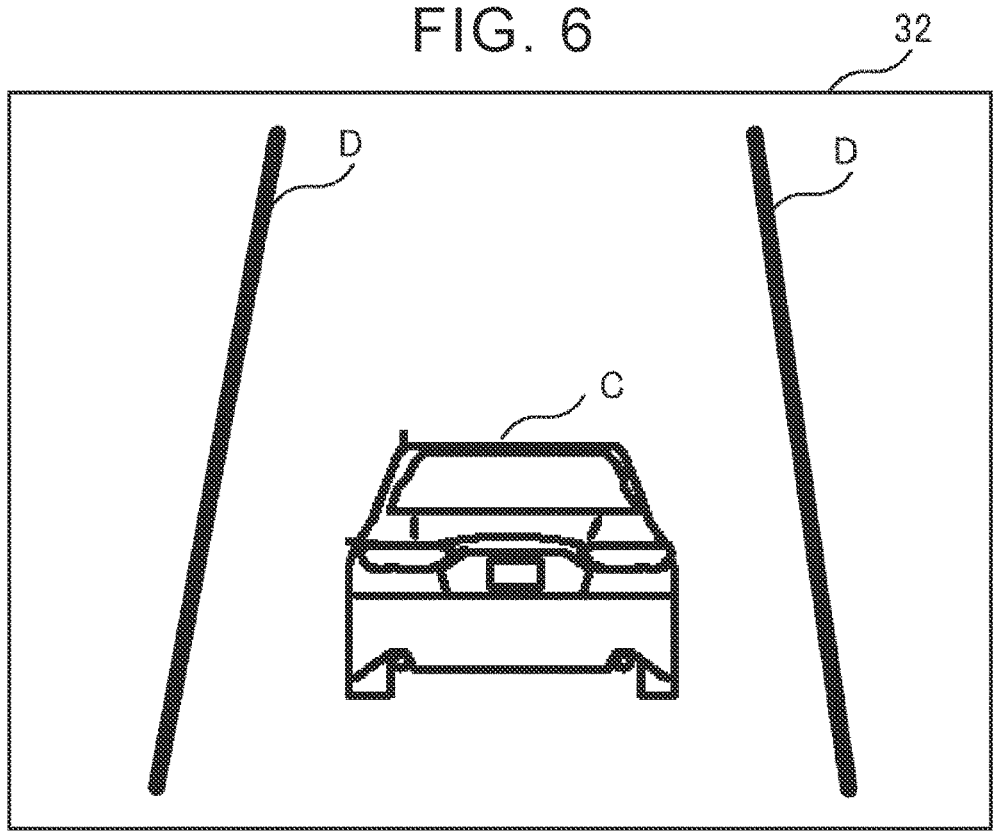
FIG. 6 is a schematic diagram illustrating an example of a continuous line screen according to the embodiment.

As illustrated in FIG. 6, displayed in the continuous line screen are the lane marking images D displayed in continuous lines, and a vehicle image C representing the vehicle 12.

In step S104, the CPU 20A displays on the monitor 32 a dotted line screen conforming to a predetermined format. The flow then transitions to step S110.

Figure 7:
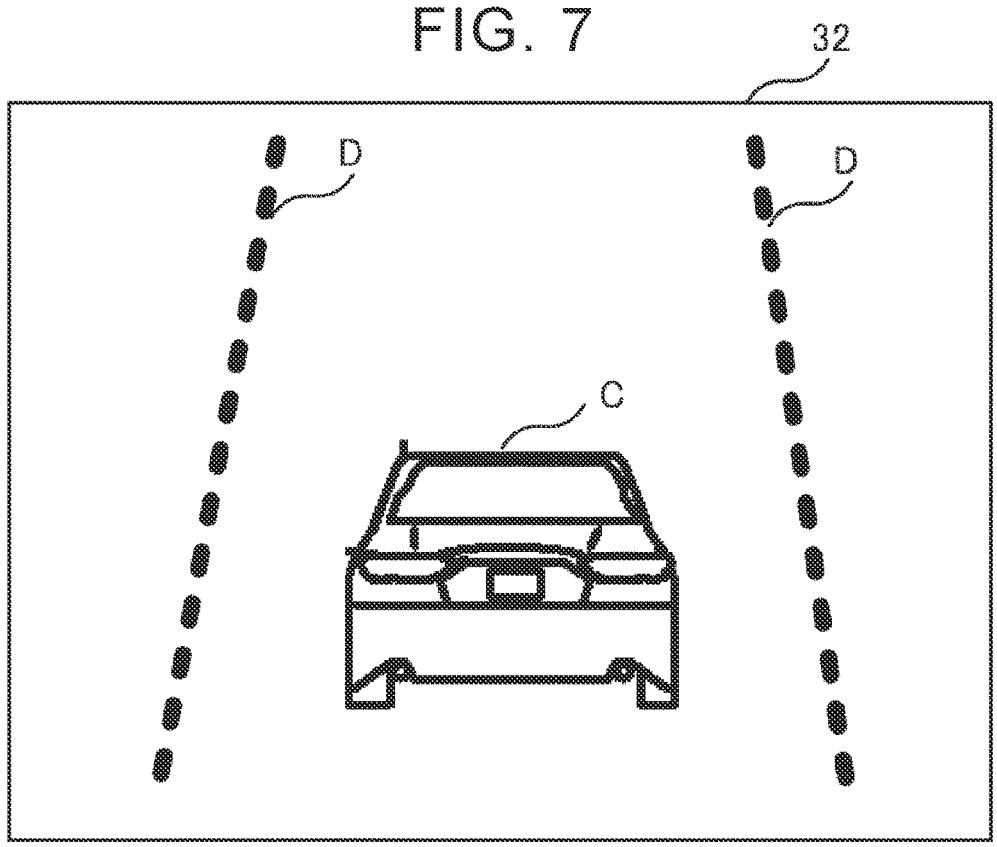
FIG. 7 is a schematic diagram illustrating an example of a dotted line screen according to the embodiment.

As illustrated in FIG. 7, displayed in the dotted line screen are the lane marking images D displayed in dotted lines, and the vehicle image C.

In step S105, the CPU 20A acquires the distance between the vehicle 12 and the lane markings W. Specifically, the CPU 20A performs image processing regarding the image data and acquires the distance between the central point P at the front end portion of the vehicle 12 and the intersecting point Q.

In step S106, the CPU 20A determines whether the vehicle 12 is approaching the lane marking W. Specifically, the CPU 20A determines whether the distance between the vehicle 12 and the lane marking W is no more than the proximity distance. When the vehicle 12 is approaching the lane marking W (YES in step S106), the CPU 20A transitions to step S107. On the other hand, when the vehicle 12 is not approaching the lane marking W (NO in step S106), the CPU 20A transitions to step S110.

In step S107, the CPU 20A determines whether the distance between the vehicle 12 and the lane marking W is no more than the warning distance. When the distance between the vehicle 12 and the lane marking W is no more than the warning distance (YES in step S107), the CPU 20A transitions to step S108. On the other hand, when the distance between the vehicle 12 and the lane marking W is greater than the warning distance (NO in step S107), the CPU 20A transitions to step S109.

In step S108, the CPU 20A displays on the monitor 32 an enhanced display screen conforming to a predetermined format. The flow then transitions to step S110.

Figure 8:
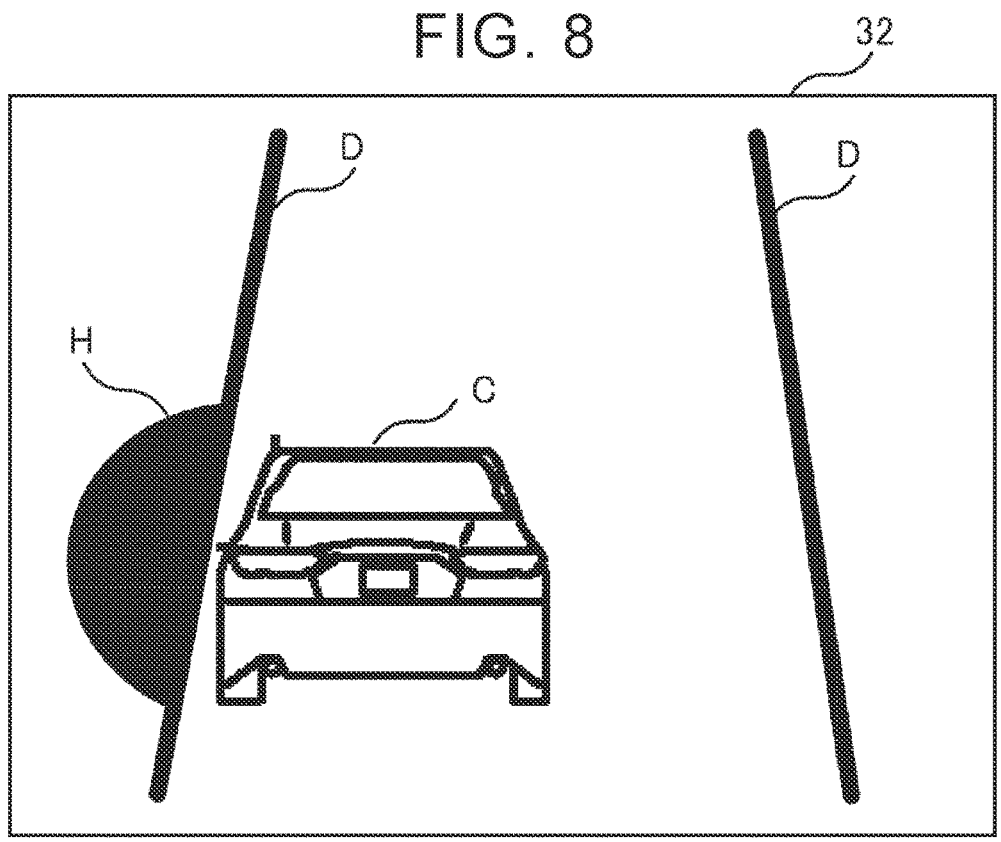
FIG. 8 is a schematic diagram illustrating an example of an enhanced display screen according to the embodiment.

As illustrated in FIG. 8, displayed in the enhanced display screen are the lane marking images D displayed with continuous lines, the warning image H, of which the shape is semicircular, and the vehicle image C. Note that the warning image H is displayed adjacent to the lane marking image D which the vehicle 12 is approaching. Specifically, when the vehicle 12 is approaching the lane marking WL on the left side in the direction of travel, the warning image H is displayed adjacent to the lane marking image D on the left side. On the other hand, when the vehicle 12 is approaching the lane marking WR on the right side in the direction of travel, the warning image H is displayed adjacent to the lane marking image D on the right side. Also, the vehicle image C is displayed at a position away from the center position in a width direction of the object lane in proportion to the distance between the vehicle 12 and the lane marking W.

In step S109, the CPU 20A displays on the monitor 32 a normal display screen conforming to a predetermined format. The flow then transitions to step S110.

Figure 9:
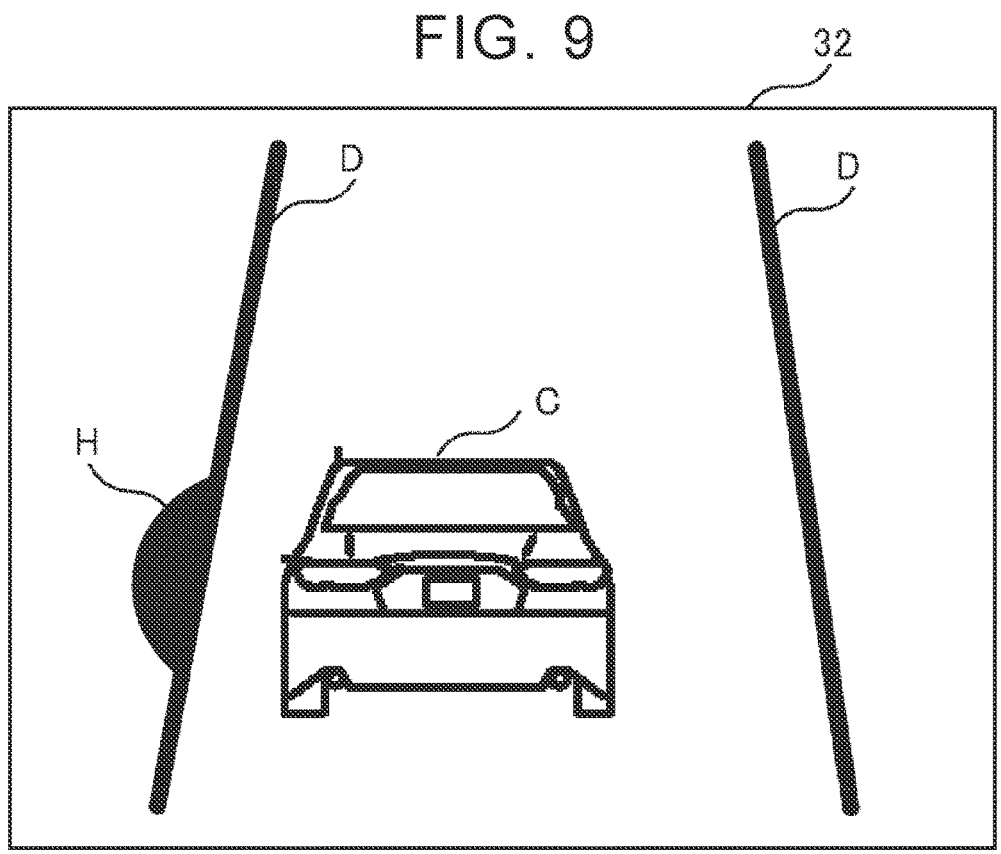
FIG. 9 is a schematic diagram illustrating an example of a normal display screen according to the embodiment.

As illustrated in FIG. 9, displayed in the normal display screen are the lane marking images D displayed with continuous lines, the warning image H, and the vehicle image C. Note that in the same way as with the enhanced display screen, the warning image H displayed on the normal display screen is displayed adjacent to the lane marking image D which the vehicle 12 is approaching. Also, the warning image H displayed in the normal display screen is a smaller image than the warning image H displayed in the enhanced display screen. Also, the vehicle image C displayed in the normal display screen is displayed at a position closer to the center position in the width direction of the object lane than the vehicle image C displayed in the enhanced display screen.

Note that the shape of the warning image H does not have to be semicircular. For example, the warning image H may be a rectangular shape, a circular shape, or a form in which stars, circles, or the like are laid out, or the like. Also, in the examples illustrated in FIGS. 8 and 9, the warning image H is filled in by the same color, regardless of the distance from the lane marking image D. However, this example is not limiting. For example, the warning image H may have a lighter color the farther away from the lane marking image D, or a darker color the farther away from the lane marking image D. Also, the warning image H does not have to be filled in.

In step S110, the CPU 20A determines whether driving of the vehicle 12 has ended. Specifically, the CPU 20A determines whether driving of the vehicle 12 has ended, via a sensor that detects the rotation state of the ignition key. The CPU 20A ends the vehicle display control processing when driving of the vehicle 12 is ended (YES in step S110). On the other hand, when driving of the vehicle 12 has not ended (NO in step S110), the CPU 20A returns to step S100.

Summarization of Embodiment

As described above, according to the display control device 20 of the present embodiment, the reason why calling attention is not performed can be comprehended, by being able to comprehend whether the predetermined condition is satisfied.

Also, the control unit 220 according to the present embodiment displays the lane marking image D in a more enhanced manner when the predetermined condition is satisfied, as compared to when the predetermined condition is not satisfied. Thus, the driver can be made to take caution so that the vehicle does not approach the lane marking W.

Also, the acquisition unit 210 according to the present embodiment acquires the speed of the vehicle 12. Also, the control unit 220 according to the present embodiment displays the lane marking image D in different display styles depending on whether the speed of the vehicle 12 is no lower than the predetermined speed or the speed of the vehicle 12 is lower than the predetermined speed. Accordingly, when the speed of the vehicle 12 is no lower than the predetermined speed and the vehicle 12 is approaching the lane marking W, calling attention is performed, so that the safety of pedestrians can be protected.

Also, the control unit 220 according to the present embodiment displays the warning image H when the predetermined condition is satisfied and also the vehicle 12 is approaching the lane marking W. Thus, the driver can intuitively recognize that the vehicle 12 is approaching the lane marking W and that caution is required.

Also, the acquisition unit 210 according to the present embodiment acquires the distance between the vehicle 12 and the lane marking W. Further, the control unit 220 according to the present embodiment displays the warning image H in a display style that differs in accordance with the distance between the vehicle 12 and the lane marking. Accordingly, the level of distance between the vehicle 12 and the lane marking W can be recognized.

REMARKS

The display control device 20 according to the above embodiment is built into the vehicle 12. However, this example is not limiting. For example, the display control device 20 may be installed outside of the vehicle 12.

Also, in the above embodiment, the CPU 20A displays the lane marking image D and the warning image H on the monitor 32 provided to the vehicle 12. However, this example is not limiting. For example, the CPU 20A may display the lane marking image D and the warning image H on a display terminal such as a smartphone or the like provided outside of the vehicle 12.

Also, in the above embodiment, the warning image H is displayed in two sizes. However, this example is not limiting. The warning image H may be displayed in three or more sizes.

Various types of processors other than the CPU may execute the various types of processing executed by the CPU 20A by reading the software (program) in the above embodiment. In this case, examples of the processors include a programmable logic device (PLD) of which the circuit configuration can be changed after manufacturing, such as a field-programmable gate array (FPGA) or the like, and a dedicated electrical circuit that is a processor having a circuit configuration designed exclusively to execute specific processing, such as an application-specific integrated circuit (ASIC) or the like, and so forth. Also, the above processing may be performed by one of these various types of processors, or may be executed by a combination of two or more processors of the same type or different types (e.g., a plurality of FPGAs, a combination of a CPU and an FPGA, and so forth). Also, the hardware configurations of these various types of processors are, more specifically, an electrical circuit composed of a combination of circuit elements such as semiconductor elements and so forth.

Also, description is made in the above embodiment by way of a form in which the programs are stored (installed) in a computer-readable non-transitory recording medium in advance. For example, the processing program 100 in the display control device 20 is stored in the ROM 20B in advance. However, this is not limiting, and the programs may be provided in the form of being stored in a non-transitory recording medium such as compact disc read-only memory (CD-ROM), digital versatile disc read-only memory (DVD-ROM), Universal Serial Bus (USB) memory, or the like. Alternatively, an arrangement may be made in which the programs are downloaded from an external device via a network.

The flow of processing described in the above embodiment is also exemplary. Unnecessary steps may be deleted, new steps may be added, and the order of carrying out processing may be changed without departing from the scope of the present disclosure.

What is claimed is:

1. A vehicle display control device, comprising a processor configured to:
    detect a lane marking in an object lane in which a vehicle is traveling;
    acquire a speed of the vehicle; and
    when the vehicle is approaching the lane marking, display a lane marking image representing the lane marking in different display styles depending on whether the speed of the vehicle is lower than a predetermined speed or not.

2. The vehicle display control device according to claim 1, wherein the processor is configured to display the lane marking image in a more enhanced manner when the speed of the vehicle is not lower than the predetermined speed, as compared to when the speed of the vehicle is lower than the predetermined speed.

3. The vehicle display control device according to claim 1, wherein the processor is configured to display a warning image for calling of the attention when the speed of the vehicle is not lower than the predetermined speed and the vehicle is approaching the lane marking.

4. The vehicle display control device according to claim 3, wherein the processor is configured to:
    acquire a distance between the vehicle and the lane marking; and
    display the warning image in different display styles in accordance with the distance between the vehicle and the lane marking.

5. The vehicle display control device according to claim 1, wherein the processor is configured to display a warning image together with the lane marking image when the speed of the vehicle is not lower than the predetermined speed and the vehicle is approaching the lane marking, the warning image being displayed in a more enhanced manner as a distance between the vehicle and the lane marking that the vehicle is approaching decreases.

6. A vehicle display control method, comprising:
    detecting, by a processor, a lane marking in an object lane in which a vehicle is traveling;
    acquiring a speed of the vehicle; and
    when the vehicle is approaching the lane marking, displaying, by the processor, a lane marking image representing the lane marking in different display styles depending on whether the speed of the vehicle is lower than a predetermined speed or not.

7. The vehicle display control method according to claim 6, further comprising
    displaying, by the processor, a warning image together with the lane marking image when the speed of the vehicle is not lower than the predetermined speed and the vehicle is approaching the lane marking, the warning image being displayed in a more enhanced manner as a distance between the vehicle and the lane marking that the vehicle is approaching decreases.

8. A non-transitory storage medium storing instructions that are executable by one or more processors and that cause the one or more processors to perform functions comprising:
    detecting a lane marking in an object lane in which a vehicle is traveling;
    acquiring a speed of the vehicle; and
    when the vehicle is approaching the lane marking, displaying a lane marking image representing the lane marking in different display styles depending on whether the speed of the vehicle is lower than a predetermined speed or not.

9. The non-transitory storage medium according to claim 8, wherein the instructions further cause the one or more processors to perform the function of:
- displaying a warning image together with the lane marking image when the speed of the vehicle is not lower than the predetermined speed and the vehicle is approaching the lane marking, the warning image being displayed in a more enhanced manner as a distance between the vehicle and the lane marking that the vehicle is approaching decreases.

* * * * *